W. Brower,
Bridle Bit,
Nº 66,941. Patented July 23, 1867.
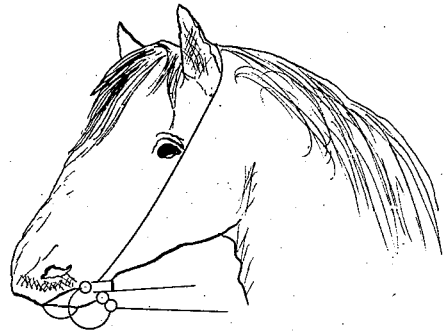
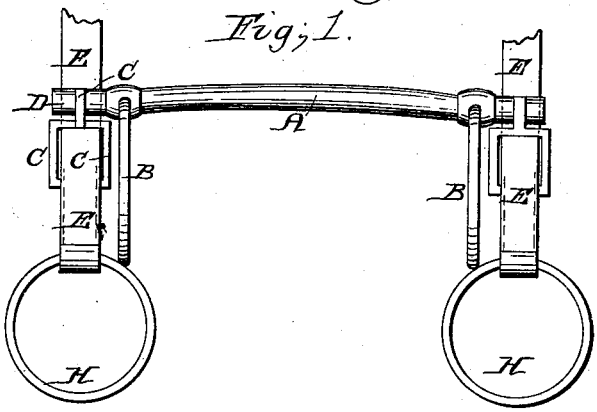
Fig. 1. Fig. 2.
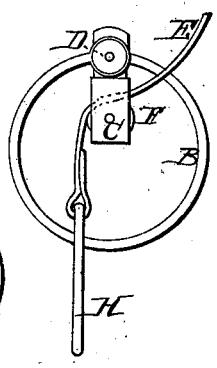
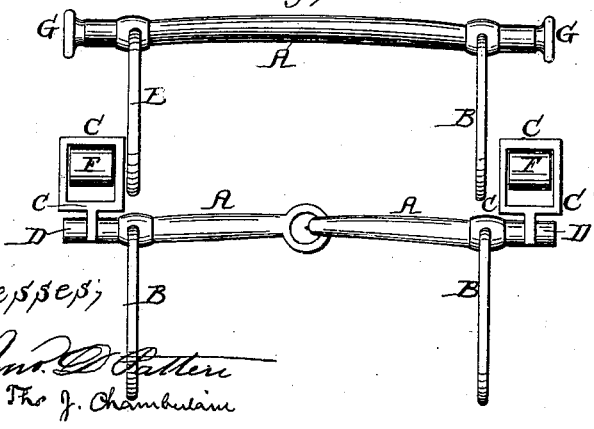
Fig. 3.
Witnesses;
Jno. D. Patten
Thos. J. Chamberlain
Inventor;
William Brower by atty A.B. Stoughton

United States Patent Office.

WILLIAM BROWER, OF BALTIMORE, MARYLAND.

Letters Patent No. 66,941, dated July 23, 1867.

IMPROVEMENT IN PULLEY-BITS FOR BRIDLES.

*The Schedule referred to in these Letters Patent and making part of the same.*

TO ALL WHOM IT MAY CONCERN:

Be it known that I, WILLIAM BROWER, of the city and county of Baltimore, and State of Maryland, have invented certain new and useful Improvements in Pulley-Bits for Bridles; and I do hereby declare the following to be a full, clear, and exact description of the same, reference being had to the accompanying drawings, making a part of this specification, in which—

Figure 1 represents a curb-bit with my improvement attached.

Figure 2 represents an end view of the same.

Figure 3 represents a view of the bit, as it appears when the pulleys are removed or not used with it.

Figure 4 represents a snaffle-bit with the pulleys applied thereto.

I am aware that pulleys have been applied to bridle-bits, but in such way that drawing upon the reins passing through them turns the bit in the horse's mouth and thus injures its efficiency, and makes them otherwise objectionable.

My invention consists first in swivelling the pulley-frame to the ends of the bit, so that in drawing the reins through them the pulley-frames and pulleys will or may turn on the bit, and leave the latter in its natural position in the horse's mouth; and my invention further consists in making the pulley-frames removable, and supplying their places with a milled or other ornamented nut, so that the bit can be used with or without the pulleys as necessity may require.

To enable others skilled in the art to make and use my invention, I will proceed to describe the same with reference to the drawings.

The bit-bar A may be of the curb or snaffle form, and furnished with the usual rings B B for the reins. The openings through the bit that the rings pass through are of the same curve as the rings, and consequently freely move around therein. The bit-bar is extended beyond the rings far enough to form journals upon which the pulley-frames C C can freely turn,-they being held thereto by nuts D run on to the extreme ends of the bit-bar. The rein E that passes through or over the pulleys F in these frames may pass over the horse's head, and when the rider or driver draws upon them, they turn on the bit, and do not turn the bit as by those heretofore used. That these bits may be used with or without the pulleys, I make them removable from their journals or shanks, and that said journals or shanks should not have an unsightly appearance, I make nicely milled or otherwise ornamented burs or nuts G, that run on to the screw-thread cut on said projecting ends and make a very neat finish. With very vicious horses, instead of fastening the reins in the rings H H, these rings or the ends of these straps may be fastened to the collar, hames, or some other part of the harness or equipment, and the riding or driving-reins fastened to the straps above the pulleys, which would give the user an almost unlimited amount of leverage upon the rein.

Having thus fully described my invention, what I claim therein as new, and desire to secure by Letters Patent, is—

In combination with a bridle-bit, the pulley-frames and pulleys hinged or swivelled to the ends thereof, so that by drawing upon the reins passing around said pulleys there shall be no tendency of the bit to turn in the horse's mouth, substantially as described.

I also claim so combining the pulley-frames and pulleys with the bits as that they can be removed therefrom without impairing its use as an ordinary bit, substantially as herein described and represented.

WM. BROWER.

Witnesses:
A. B. STOUGHTON,
J. HOLTZMAN.